(12) United States Patent
Li et al.

(10) Patent No.: US 9,273,852 B2
(45) Date of Patent: Mar. 1, 2016

(54) ROTARY LAMP HOLDER

(75) Inventors: Liangqing Li, Zhaoqing (CN); Xiaobing Wang, Zhaoqing (CN)

(73) Assignee: Zhaoqing Hengyi Industrial Company Ltd., Zhaoqing (CN)

( * ) Notice: Subject to any disclaimer, the term of this patent is extended or adjusted under 35 U.S.C. 154(b) by 215 days.

(21) Appl. No.: 14/004,883

(22) PCT Filed: Mar. 15, 2012

(86) PCT No.: PCT/CN2012/072370
§ 371 (c)(1),
(2), (4) Date: Sep. 12, 2013

(87) PCT Pub. No.: WO2012/126329
PCT Pub. Date: Sep. 27, 2012

(65) Prior Publication Data
US 2014/0003029 A1  Jan. 2, 2014

(30) Foreign Application Priority Data

Mar. 24, 2011 (CN) .......................... 2011 1 0071050
Feb. 10, 2012 (CN) .......................... 2012 1 0030485

(51) Int. Cl.
*F21V 14/08* (2006.01)
*F21V 1/10* (2006.01)
(Continued)

(52) U.S. Cl.
CPC . *F21V 14/08* (2013.01); *F21V 1/10* (2013.01); *G09F 13/04* (2013.01); *H02K 7/116* (2013.01)

(58) Field of Classification Search
CPC ........ F21V 1/10; H02K 7/116; B60Q 1/2611; F21S 10/06

USPC ................................ 362/95, 372; 301/83, 71
See application file for complete search history.

(56) References Cited

U.S. PATENT DOCUMENTS 926,781 A * 7/1909 Townsend ........................ 362/35
4,097,917 A * 6/1978 McCaslin ...................... 362/565
(Continued)

FOREIGN PATENT DOCUMENTS

CN          200986165 Y       12/2007
CN          201050733 Y        4/2008
(Continued)

OTHER PUBLICATIONS

State Intellectual Property Office of China, International Search Report of PCT/CN2012/072370, WIPO, Jun. 28, 2012, 4 pages.

*Primary Examiner* — Anabel Ton
(74) *Attorney, Agent, or Firm* — Alleman Hall McCoy Russell & Tuttle LLP (57) ABSTRACT

A rotary lamp holder comprises a housing having a first longitudinal end and a second longitudinal end, the first longitudinal having an opening, a motor stator disposed around the inner circumference of the housing, a rotating shaft and rotatably mounted in the housing, the rotating shaft defining a cavity in communication with the opening of the first longitudinal end, a motor rotor fixed to the rotating shaft and coaxially disposed with the motor stator, a lamp cover bracket rotatably mounted relative to the housing and extending out of the first longitudinal, and a reduction transmission system located in the housing and connected to the rotating shaft and the lamp cover bracket respectively. Since the rotary lamp holder is compact in structure and size and can completely match any standard lamp holder and lamp cover, it can become a universal substitute for the lamp holder mounted on ordinary lamps.

25 Claims, 13 Drawing Sheets (51) Int. Cl.
*H02K 7/116* (2006.01)
*G09F 13/04* (2006.01)

(56) References Cited

U.S. PATENT DOCUMENTS

| | | | |
|---|---|---|---|
| 4,531,072 A | 7/1985 | Weaver et al. | |
| 4,921,429 A * | 5/1990 | Brown | 439/26 |
| 6,485,165 B1 | 11/2002 | Ho | |
| 8,106,549 B2 * | 1/2012 | Shimizu et al. | 310/71 |
| 2003/0016523 A1 * | 1/2003 | Pickens | 362/35 |

FOREIGN PATENT DOCUMENTS

| | | |
|---|---|---|
| CN | 201985685 U | 9/2011 |
| CN | 202008053 U | 10/2011 |
| CN | 202008072 U | 10/2011 |
| CN | 202008093 U | 10/2011 |
| CN | 202008096 U | 10/2011 |
| CN | 102252284 A | 11/2011 |

* cited by examiner

ROTARY LAMP HOLDER

TECHNICAL FIELD

The present invention generally relates to a rotary light-emitting object, particularly to a rotary lamp holder (also referred to as "motor") for use in a rotary light-emitting object such as a rotary lamp.

BACKGROUND ART

Rotary lamps in the prior art generally comprise a rotatable lamp cover to make the lamp have a better visual appearance and display effect and expand the scope of use thereof. However, conventional rotary lamps are structurally complicated. To allow for rotation of the lamp cover, the entire lamp including the lamp cover needs to be designed as a unitary closed type. The unitary closed type rotary lamp, having a complicated structure, is costly and does not facilitate replacement of a light source such as a bulb and a tube. Usually, it is preferable to have a professional repairer replace the light source. Furthermore, when a transmission mechanism is designed, the conventional rotary lamp integrates the transmission mechanism and a specific structure of a particular lamp in one piece, for example, one lamp can only be adaptable for one lamp cover so that adaptability and universality of the lamp are rendered undesirable.

Furthermore, conventional rotary devices not only need an individual motor but also require an output shaft of the motor and a rotational axis of the rotary object to be staggered from each other. As a result, the entire rotary device is structurally complicated and too large in size.

SUMMARY OF THE INVENTION

An object of the present invention is to provide a structurally compact rotary lamp holder which can, as a standardized assembly, directly replace an original lamp holder of a conventional standardized lamp to enable the original lamp to become a lamp with a rotary lamp cover, without changing the structural design of a conventional standardized lamp, such as a table lamp or a pendant lamp.

According to a first aspect of the present invention, there is provided a rotary lamp holder, comprising:

a housing having a first longitudinal end and a second longitudinal end, the first longitudinal end of the housing having an opening;

a motor stator disposed around the inner circumference of the housing;

a rotating shaft located in the housing and rotatably mounted relative to the housing, the rotating shaft defining a cavity in communication with the opening of the first longitudinal end of the housing;

a motor rotor fixed to the rotating shaft and coaxially disposed with the motor stator;

a lamp cover bracket rotatably mounted relative to the housing and extending out of the first longitudinal end of the housing; and a reduction transmission system located in the housing and connected to the rotating shaft and the lamp cover bracket respectively.

Preferably, the second longitudinal end of the housing also has an opening, and the cavity of the rotating shaft is in communication with the opening of the second longitudinal end of the housing. In this case, the rotary lamp holder can also comprise a lead wire post fixed in the housing and running through the cavity of the rotating shaft, and the lead wire post defines a lead wire chamber in communication with the openings of the first and second longitudinal ends of the housing respectively, wherein the rotating shaft is rotatably mounted about the lead wire post. Preferably, the lamp cover bracket is also rotatably mounted about the lead wire post. The lead wire post has a first end and a second end which can extend out of the openings of the respective longitudinal ends of the housing. The rotary lamp holder can further comprise a light source receiving socket mounted at the first or second end of the lead wire post. The lead wire post can be provided with a radial through hole such that the lead wire chamber of the lead wire post is in communication with the interior of the housing.

The reduction transmission system can comprise: an output gear fixed to the rotating shaft; a driven gear fixed to the lamp cover bracket; and an intermediate reduction gear train engaged with the output gear and the driven gear respectively.

Alternatively, the reduction transmission system can comprise: an output gear fixed to the rotating shaft; a planetary gear carrier fixed to the lamp cover bracket; a planetary gear train internal gear fixed to an internal wall of the housing; a planet gear mounted on the planetary gear carrier and engaged with the output gear and the planetary gear train internal gear respectively.

The lamp cover bracket can be provided with fastening means for detachably holding the lamp cover.

Preferably, the housing and the lead wire post are both cylindrical.

Advantageously, the light source receiving socket and/or the lamp cover bracket can be standardized parts so that the conventional standardized lamps can be very conveniently changed to rotary lamps and the lamp cover can be replaced conveniently.

As a preferred embodiment of the present invention, the rotary lamp holder can further comprise a current pickup base having a first electrode and a second electrode and fixedly mounted at the first or second longitudinal end of the housing. In this case, the rotary lamp holder usually further comprises a first lead wire and a second lead wire, wherein the light source receiving socket has a first electrode and a second electrode, the first lead wire is connected to the first electrode of the current pickup base and the first electrode of the light source receiving socket respectively, and the second lead wire is connected to the second electrode of the current pickup base and the second electrode of the light source receiving socket respectively. The first lead wire and the second lead wire can also run through a radial through hole in the lead wire post to be connected to the motor.

The current pickup base is preferably shaped to enable the entire rotary lamp holder to directly replace a standardized screw-type lamp holder or bayonet-type lamp holder used on the conventional lamps. In other words, the rotary lamp holder according to the present invention is in fact completely interchangeable with the conventional standardized screw-type lamp holder or bayonet-type lamp holder. This enables the conventional ordinary lamp to be easily replaced with the rotary lamp without the help of any professional technicians.

According to a second aspect of the present invention, there is provided a rotary lamp such as a pendant lamp, a table lamp or ceiling lamp which has the above rotary lamp holder and the lamp cover mounted on the lamp cover bracket.

The lamp cover can be made into any suitable shape. In some embodiments, the lamp cover is structured in a globe shape or a hexahedral three-dimensional photo frame shape so that the entire lamp forms a rotary light-emitting globe model or a hexahedral three-dimensional photo frame. In another embodiment, the lamp cover can be designed to be for example an advertisement lamp case.

Hence, according to a third aspect of the present invention, there is provided a rotary light-emitting globe which comprises the above rotary lamp holder and a lamp cover in the form of a globe mounted on the lamp cover bracket.

According to a fourth aspect of the present invention, there is provided a rotary light-emitting hexahedral three-dimensional photo frame which comprises the above rotary lamp holder and a lamp cover in the form of a hexahedral three-dimensional photo frame mounted on the lamp cover bracket.

According to a fifth aspect of the present invention, there is provided a rotary advertisement lamp case which comprises the above rotary lamp holder and a lamp cover in the form of an advertisement lamp case mounted on the lamp cover bracket.

Since the modular rotary lamp holder according to the present invention is more compact in structure and smaller in size, it in fact constitutes a motor for use in the light-emitting rotary object.

Hence, according to a sixth aspect of the present invention, there is provided a motor for use in the light-emitting rotary object, the motor comprising:
- a housing having a first longitudinal end and a second longitudinal end, the first longitudinal end of the housing having an opening;
- a motor stator disposed around the inner circumference of the housing;
- a rotating shaft located in the housing and rotatably mounted relative to the housing, the rotating shaft defining a cavity in communication with an opening of a first longitudinal end of the housing;
- a motor rotor fixed to the rotating shaft and coaxially disposed with the motor stator;
- a bracket rotatably mounted relative to the housing and extending out of the first longitudinal end of the housing (the bracket being used to fix a rotatable portion of the light-emitting rotary object and rotating the same together therewith); and
- a reduction transmission system located in the housing and connected with the rotating shaft and the bracket respectively.

Regarding other preferable or additional aspects of the motor of the present invention, reference can be made to the above preferable or additional aspects of the rotary lamp holder of the present invention.

Lastly, the present invention further provides a light-emitting rotary object comprising the above motor.

The modular rotary lamp holder according to the present invention can be completely the same as an ordinary (standardized) lamp holder in terms of fixation of the lamp holder and the mounting of the light source and the lamp cover; such that full interchange of the modular rotary lamp holder and the ordinary lamp holder can be achieved in practical use so that the ordinary lamp can be changed to the rotary lamp very conveniently without making any changes to the main structure of the ordinary lamp, such as a table lamp or pendant lamp.

DETAILED DESCRIPTION OF THE PREFERRED EMBODIMENTS

Exemplary embodiments of the present invention will be described in detail with reference to the drawings.

Figure 1:
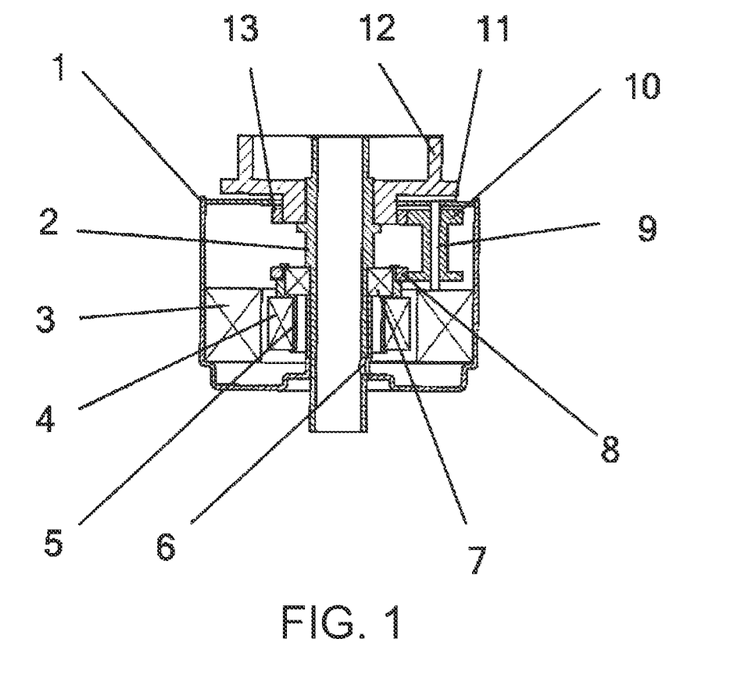
FIG. 1 is a cross-sectional view of a rotary lamp holder according to a first embodiment of the present invention.

Referring to FIG. 1, a rotary lamp holder (also simply referred to as "motor") according to a first embodiment of the present invention comprises a substantially cylindrical or cylindrical housing 1. The housing 1 has a first longitudinal end and an opposite second longitudinal end. The first longitudinal end of the housing 1 is closed by a cover plate 11. The first and second longitudinal ends are both provided with a central opening through which a substantially cylindrical lead wire post 2 runs longitudinally.

A motor stator 3 is disposed around the inner circumference of the housing 1. A (hollow) rotating shaft 5 is rotatably mounted about the lead wire post 2 by a bearing 7. A motor rotor 4 is fixed to the rotating shaft 5 and disposed coaxially with the motor stator 3. The lead wire post 2 runs through a longitudinal cavity of the rotating shaft 5 and runs out of the housing 1 through the above opening. The lead wire post 2 is further provided with a radial through hole 6 such that a lead wire chamber defined by the lead wire post 2 is in communication with the interior of the housing 1.

A lamp cover bracket 12 is rotatably mounted about the lead wire post 2 and extends out of the first longitudinal end of the housing.

An output gear 8 is fixed to the rotating shaft 5. A driven gear 13 is fixed to the lamp cover bracket 12. At least two stages of intermediate reduction gear trains 10 are mounted on a fixed gear train shaft 9 and respectively engage the output gear 8 and the driven gear 13. As such, the rotating shaft 5 rotating at a high speed can rotate the lamp cover bracket 12 together therewith slowly (e.g., the number of revolutions per minute) via the intermediate reduction gear trains.

Figure 2:
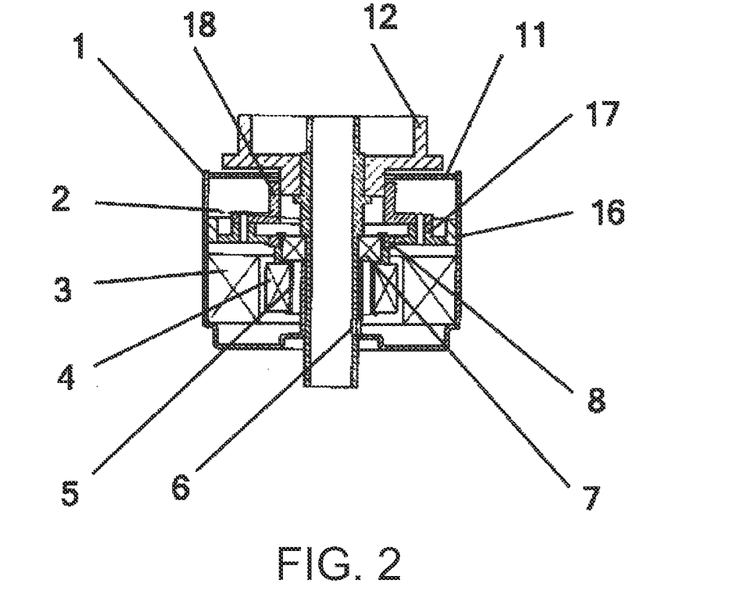
FIG. 2 is a cross-sectional view of a rotary lamp holder according to a second embodiment of the present invention.

FIG. 2 shows a rotary lamp holder according to a second embodiment of the present invention. The rotary lamp holder shown in FIG. 2 is similar to that shown in FIG. 1, and the difference therebetween lies in a reduction gear system. Referring to FIG. 2, the output gear 8 is fixed to the rotating shaft 5. A planetary gear carrier 18 is fixed to the lamp cover bracket 12. A planetary gear train internal gear 16 is fixed to an internal circumferential wall of the housing 1. A planet gear 17 is mounted on the planetary gear carrier 18 and engaged with the output gear 8 and the planetary gear train internal gear 16 respectively. As such, the planet gear 17, driven by the output gear 8, automatically rotates and furthermore revolves around the planetary gear train internal gear 16, thereby causing the planetary gear carrier 18 and therefore the lamp cover bracket 12 to rotate slowly.

Figure 3:
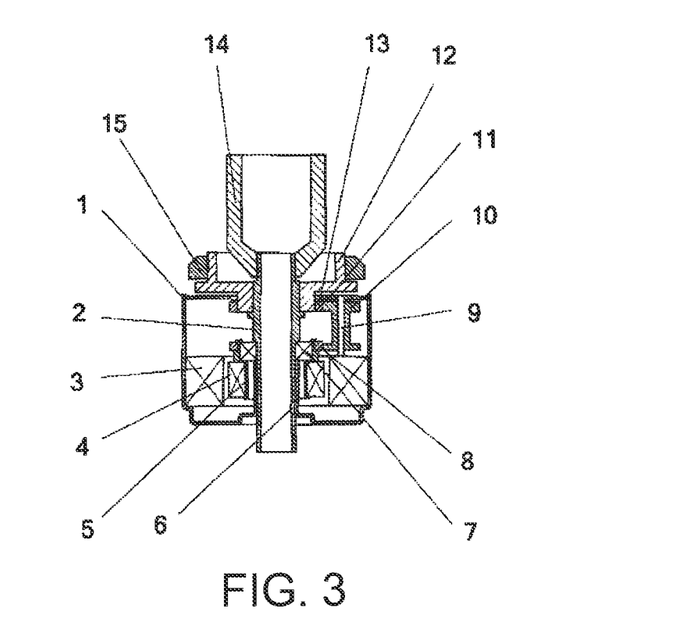
FIG. 3 is a cross-sectional view of the rotary lamp holder of FIG. 1 in which a light source receiving socket is mounted at a first end of a lead wire post.
Figure 4:
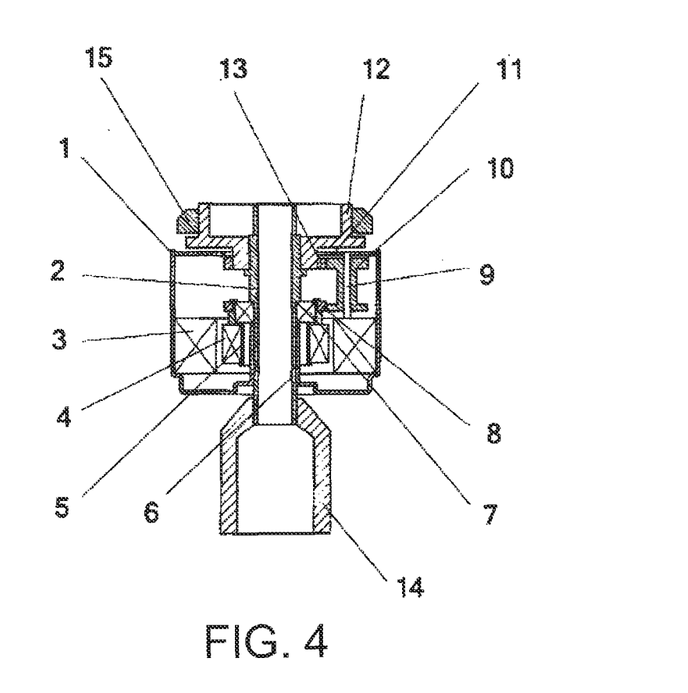
FIG. 4 is a cross-sectional view of the rotary lamp holder of FIG. 1 in which the light source receiving socket is mounted at a second end of the lead wire post.

FIG. 3 and FIG. 4 respectively show a rotary lamp holder mounted with a light source receiving socket 14 according to the first embodiment of the present invention. In FIG. 3, the light source receiving socket 14 is fixed to or detachably mounted at a first end (i.e., the first longitudinal end of the housing) of the lead wire post 2. In FIG. 4, the light source receiving socket 14 is fixed to or detachably mounted at a second end of the lead wire post 2.

Figure 5:
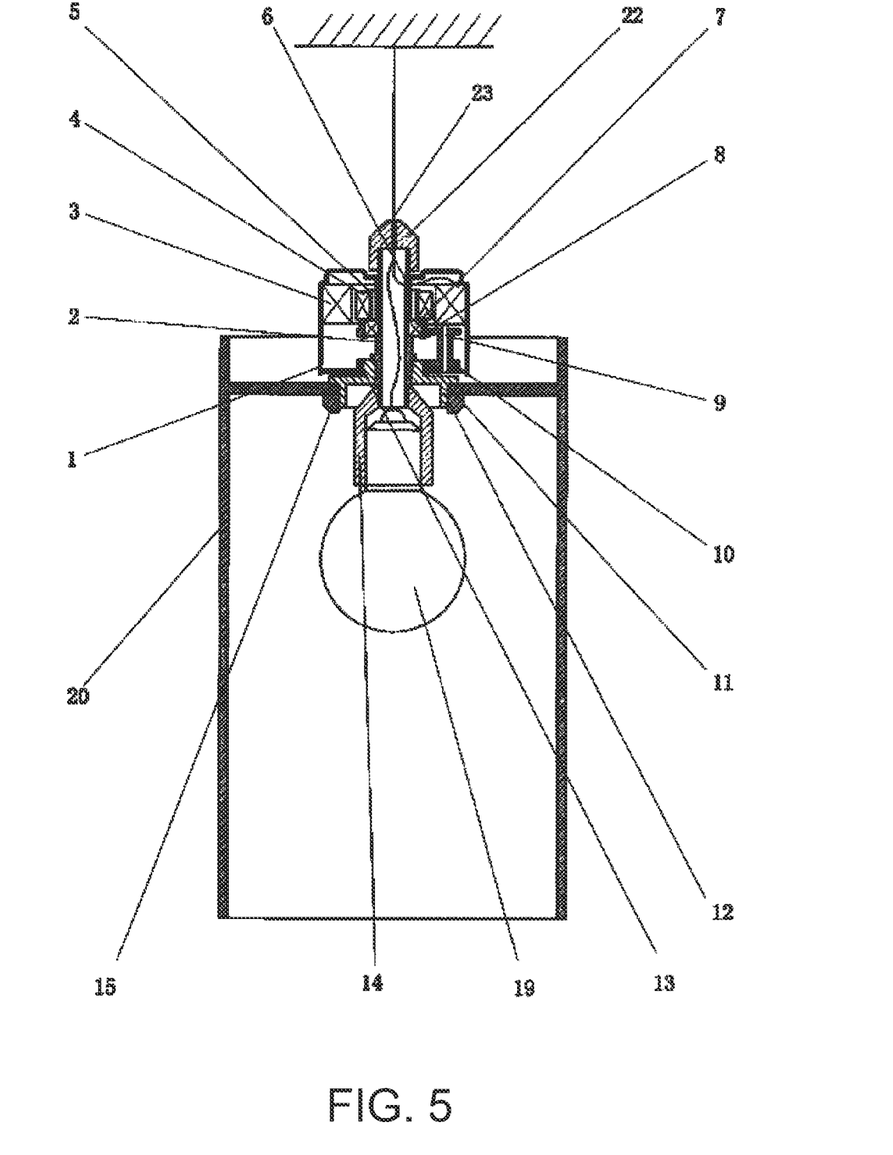
FIG. 5 is a cross-sectional view of a pendant lamp according to an embodiment of the present invention.

FIG. 5 shows a rotary pendant lamp according to an embodiment of the present invention, comprising the rotary lamp holder shown in FIG. 3, a lamp cover 20 and a light source 19 (a bulb in FIG. 5). The lamp cover 20 is detachably mounted on the lamp cover bracket 12 via any suitable fastening means such as a pressing nut 15. The light source 19 is received in the light source receiving socket 14. A power source line 23 hangs down from the ceiling, runs through the lead wire post 2 of the housing 1 via a connector 22, and then is connected to the light source receiving socket 14 or the light source 19, and connected to the motor stator 3 via the through hole 6.

Figure 6:
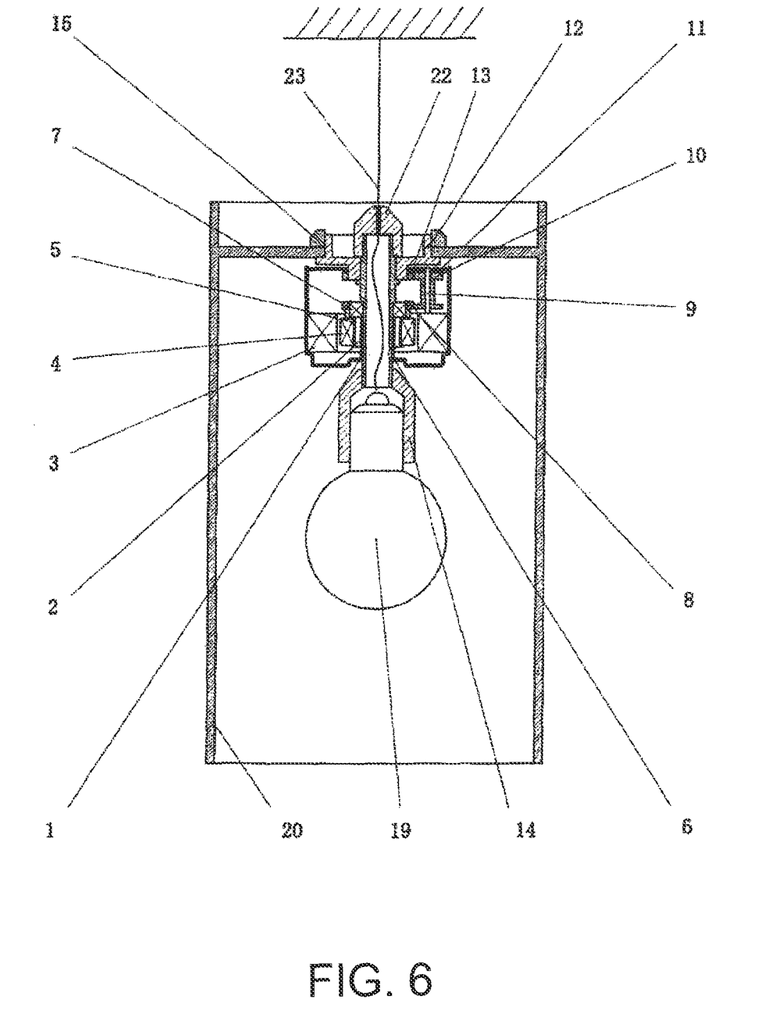
FIG. 6 is a cross-sectional view of a pendant lamp according to another embodiment of the present invention.

FIG. 6 shows a rotary pendant lamp according to a preferred embodiment of the present invention, comprising the rotary lamp holder shown in FIG. 4, the lamp cover 20 and the light source 19. When the pendant lamp with such a structure is used, the entire rotary lamp holder is entirely enclosed in the lamp cover 20 so that the entire pendant lamp appears tidier, more compact and more beautiful.

Figure 7:
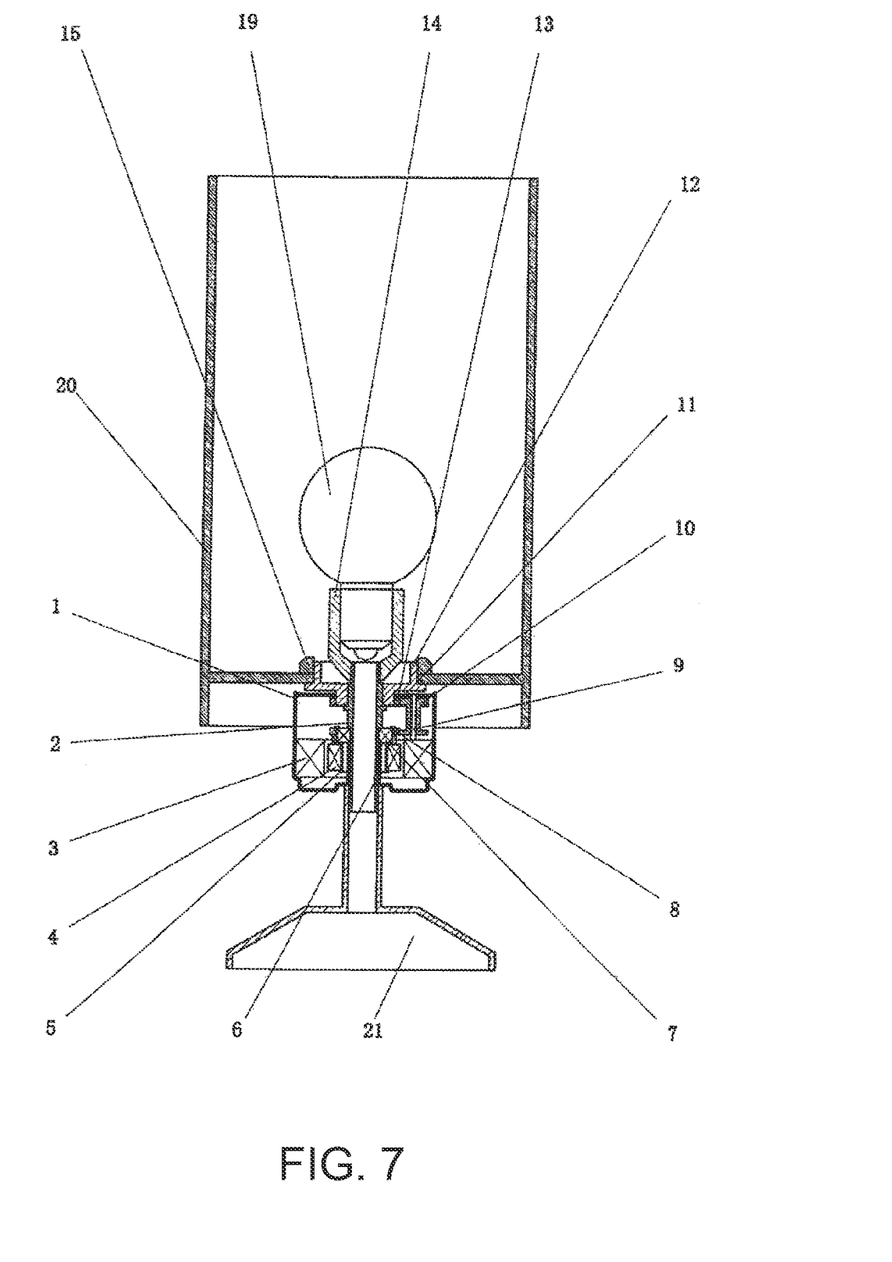
FIG. 7 is a cross-sectional view of a table lamp according to an embodiment of the present invention.

FIG. 7 shows the rotary table lamp according to an embodiment of the present invention, comprising the rotary lamp holder shown in FIG. 3, the lamp cover 20, the light source 19 and a table lamp base 21 for supporting the housing 1.

Figure 8:
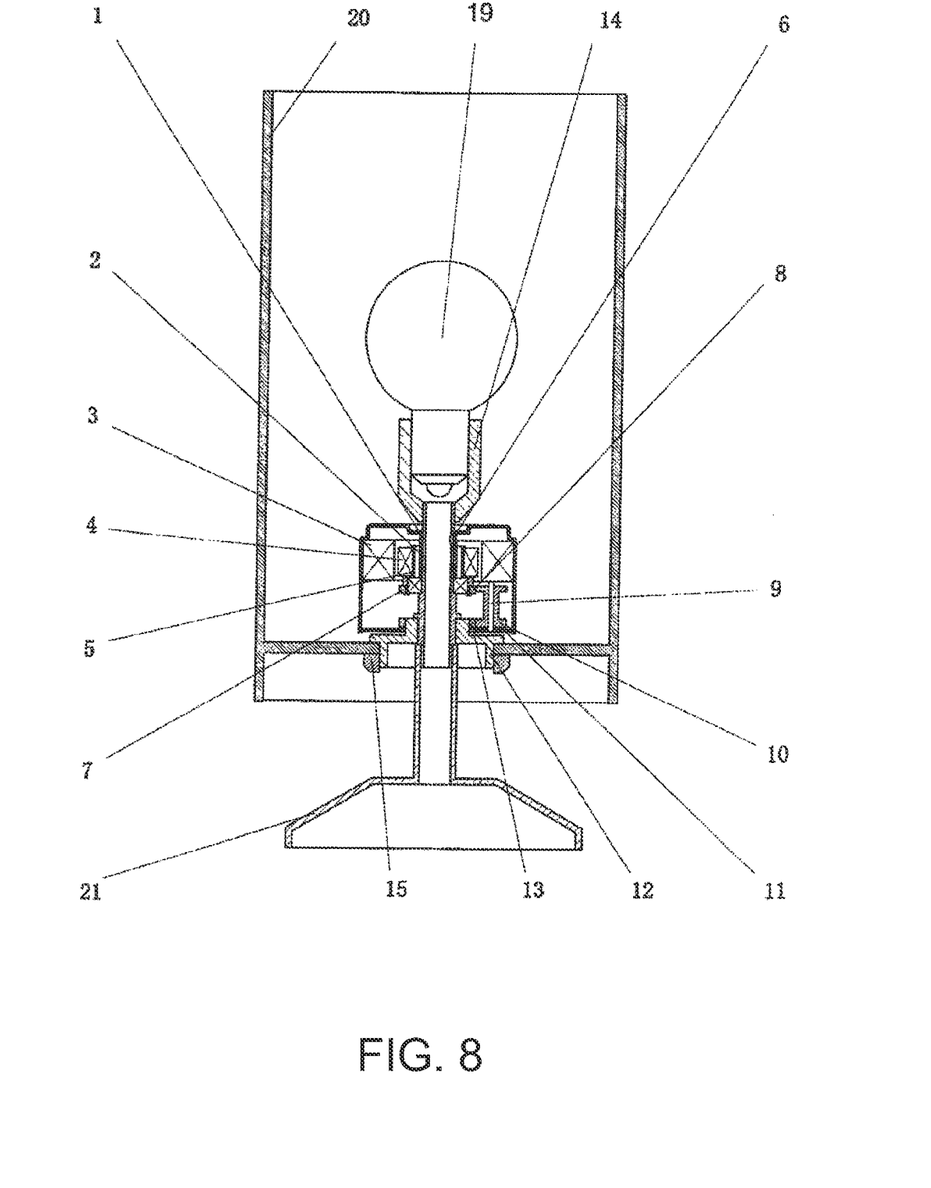
FIG. 8 is a cross-sectional view of a table lamp according to another embodiment of the present invention.

FIG. 8 shows a rotary table lamp according to a preferred embodiment of the present invention, comprising the rotary lamp holder shown in FIG. 4, the lamp cover 20, the light source 19 and the table lamp base 21 for supporting the housing 1. The rotary table lamp with such a structure also has a tidy and compact overall appearance.

Figure 9:
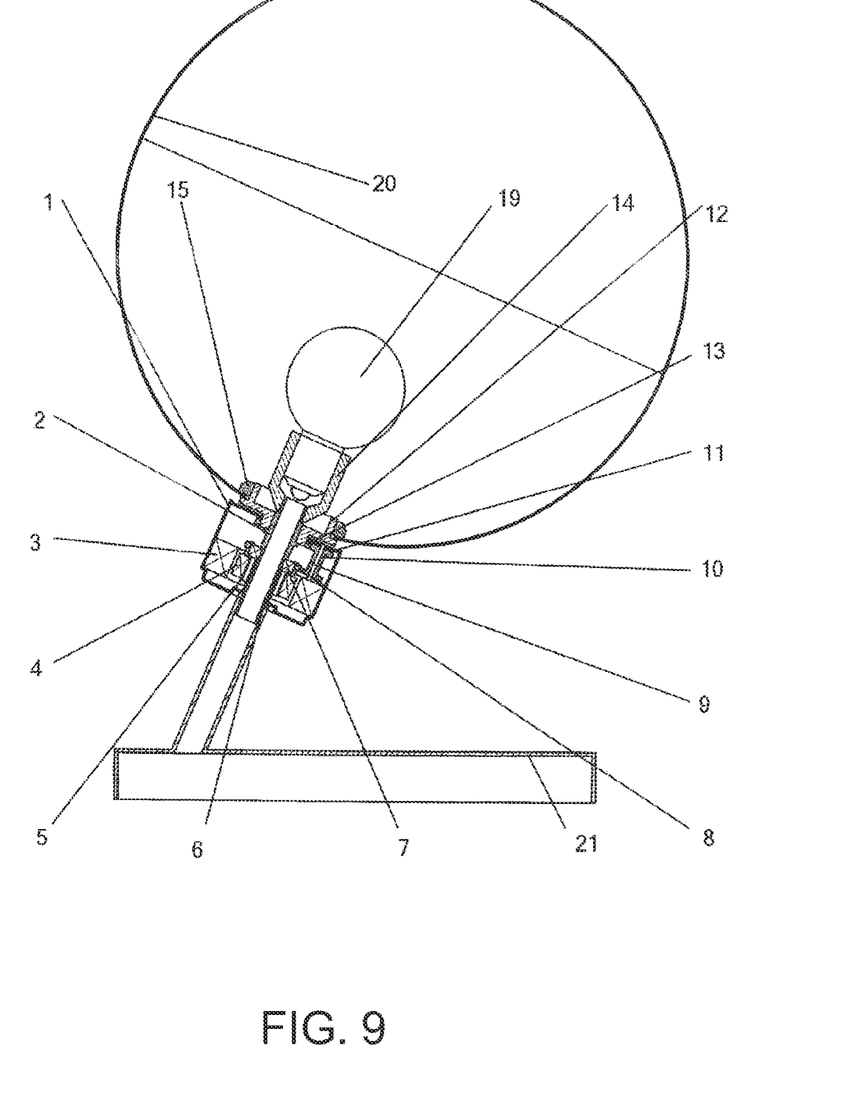
FIG. 9 is a cross-sectional view of a light emitting rotary globe according to an embodiment of the present invention.

FIG. 9 shows a light-emitting rotary globe according to an embodiment of the present invention, comprising the rotary lamp holder of FIG. 3, the lamp cover 20 in the form of a globe, the light source 19 and the table lamp base 21 for obliquely supporting the housing 1.

Figure 10:
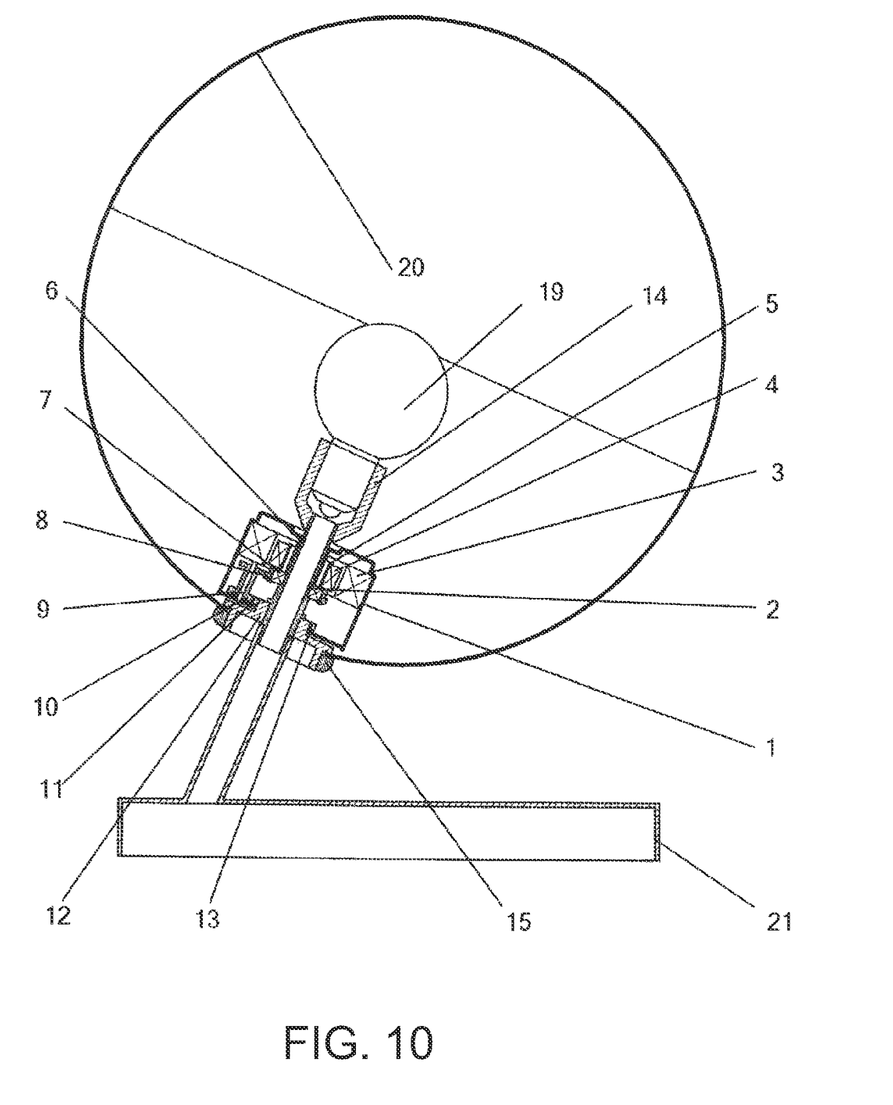
FIG. 10 is a cross-sectional view of a light emitting rotary globe according to another embodiment of the present invention.

FIG. 10 shows a light-emitting rotary globe according to a preferred embodiment of the present invention, comprising the rotary lamp holder of FIG. 4, the lamp cover 20 in the form of a globe, the light source 19 and the table lamp base 21 for obliquely supporting the housing 1. The light-emitting rotary globe with such a structure also has a tidy and compact overall appearance.

Additionally, in the embodiment of FIG. 8, the lamp cover 20 can be configured into a hexahedral three-dimensional photo frame shape so that the entire table lamp becomes a self-rotating hexahedral three-dimensional photo frame. Furthermore, the lamp cover 20 can be in the form of any advertisement lamp case having a desired shape and/or pattern.

Figure 11:
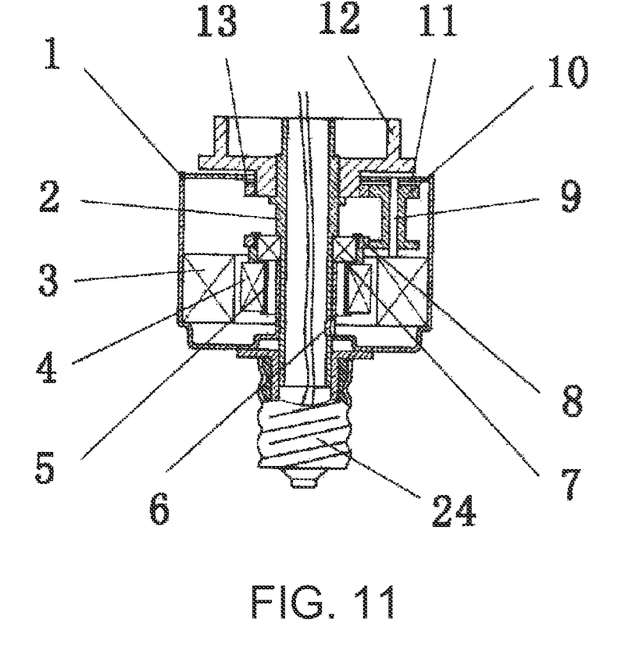
FIG. 11 shows a rotary lamp holder which is similar to FIG. 1 but has a current pickup base mounted at a second longitudinal end of a housing.

Referring to FIG. 11, a current pickup base 24 is fixedly mounted (e.g., bonded) at the second longitudinal end of the housing. Two power source lead wires (to be described in detail hereunder) of the current pickup base 24 run through a lead wire chamber of the lead wire post 2 into the interior of the housing 1. The current pickup base 24 is shaped to enable the entire rotary lamp holder to directly replace a standardized screw-type lamp holder or bayonet-type lamp holder used on conventional lamps (i.e., to be interchangeable with the conventional light source current pickup base).

Figure 13:
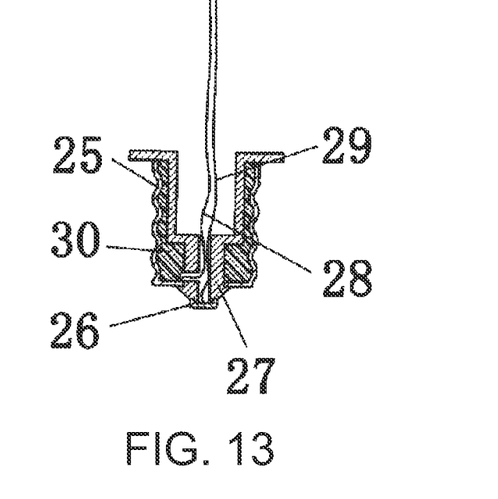
FIG. 13 is a cross-sectional view of the current pickup base according to the present invention.

FIG. 13 is a cross-sectional view of the current pickup base 24 according to the present invention. As shown in FIG. 13, the current pickup base 24 has a first electrode 25 and a second electrode 26. An insulator 27 is provided between the first electrode 25 and the second electrode 26. An insulating bonding filler 30 enables the first electrode 25 to be bonded and fixed to the insulator 27. A first power source lead wire 28 and a second power source lead wire 29 are respectively connected to the first electrode 25 and the second electrode 26. In addition, although not specifically shown, the first power source lead wire 28 and the second power source lead wire 29 can also run through the radial through hole 6 to power the motor.

Figure 12:
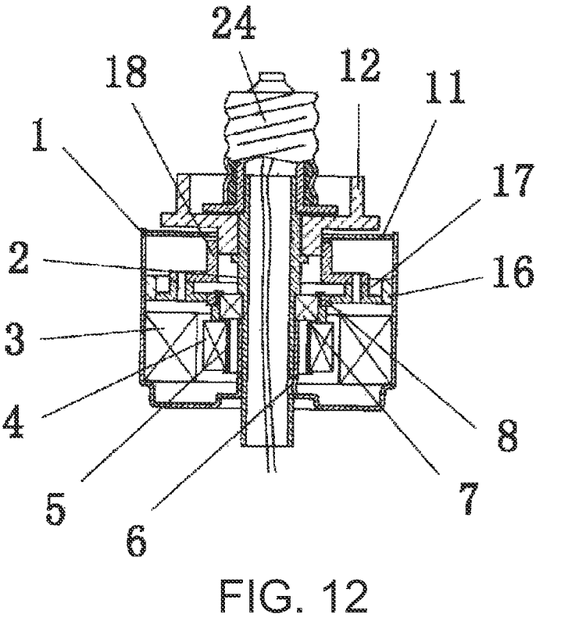
FIG. 12 shows a rotary lamp holder which is similar to FIG. 2 but has a current pickup base mounted at a first longitudinal end of a housing.

The rotary lamp holder shown in FIG. 12 is similar to that of FIG. 2, but the current pickup base 24 is fixedly mounted at the first longitudinal end of the housing.

Figure 14:
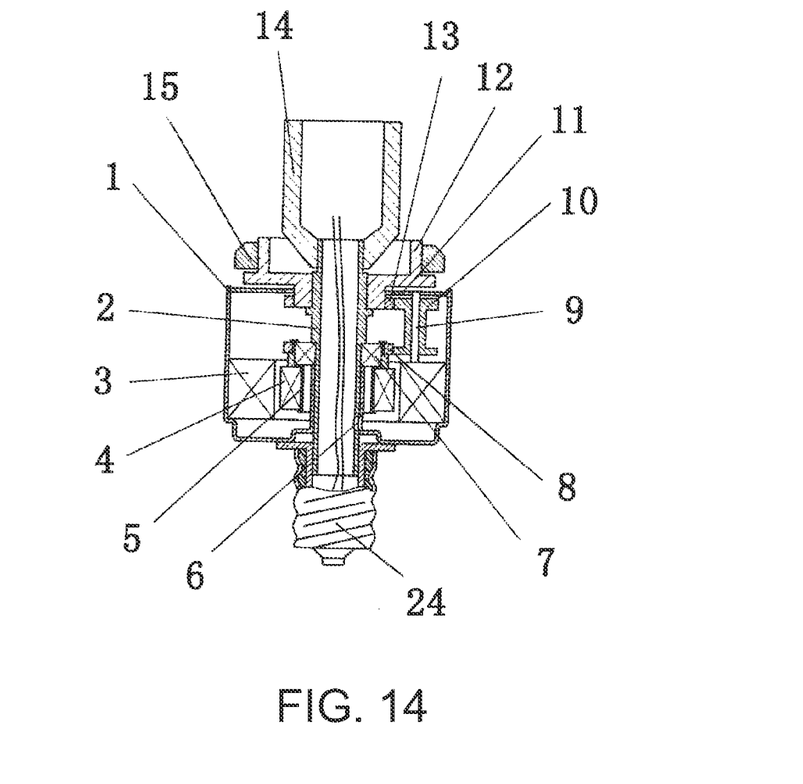
FIG. 14 is a cross-sectional view of the rotary lamp holder of FIG. 11, wherein the light source receiving socket is mounted at a first end of the lead wire post.

FIG. 14 is a cross-sectional view of the rotary lamp holder of FIG. 11, wherein the light source receiving socket 14 is mounted at a first end of the lead wire post 2 (namely, the first longitudinal end of the housing).

Figure 15:
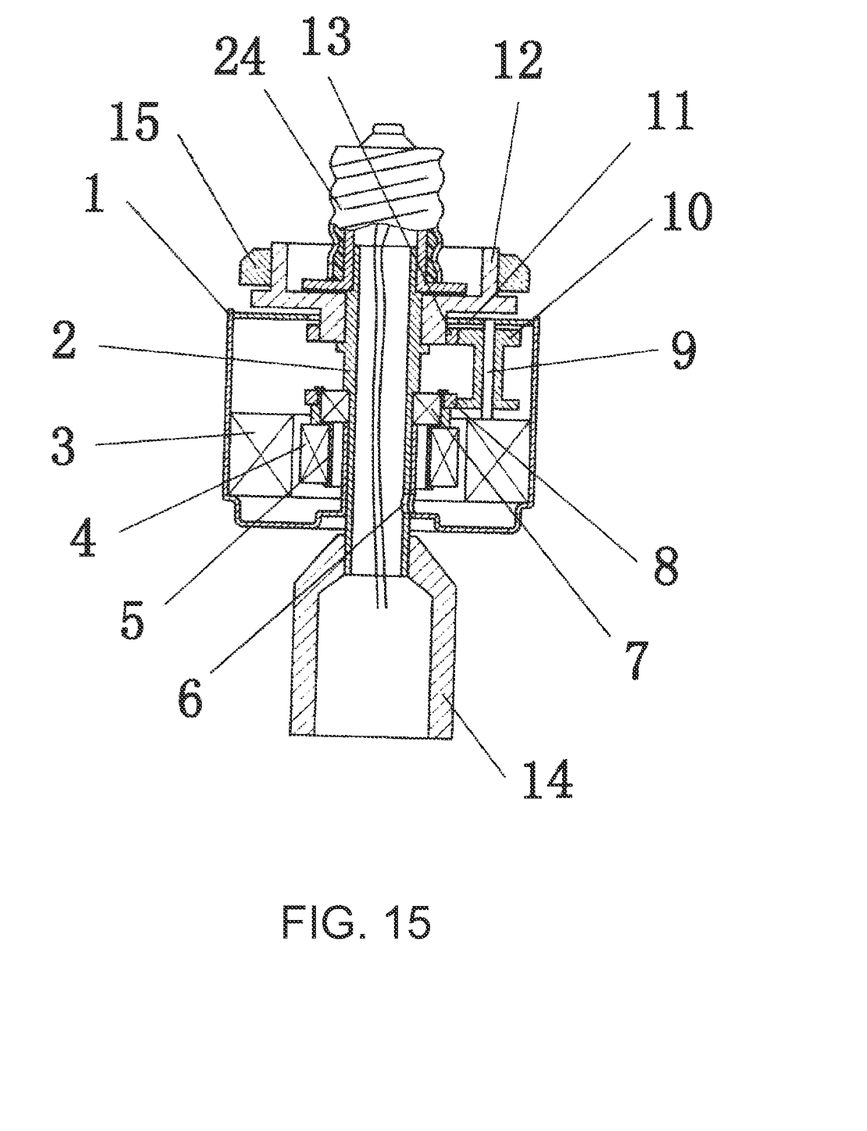
FIG. 15 shows a rotary lamp holder which is similar to FIG. 11 but has the current pickup base mounted at the first longitudinal end of the housing and the light source receiving socket mounted at a second end of the lead wire post.

The rotary lamp holder shown in FIG. 15 is similar to FIG. 11, but the current pickup base 24 is mounted at the first longitudinal end of the housing and the light source receiving socket 14 is mounted at a second end of the lead wire post 2. An internal contour of the light source receiving socket 14 can be configured to match an external contour of the current pickup base 24 to receive a commercially-available universal standardized lamp holder (e.g., the light source 19 shown in FIG. 6) or to receive another rotary lamp holder according to the present invention (the latter can result in a compound rotating effect so as to obtain a more colorful and beautiful lighting effect). The light source receiving socket 14 also has a first electrode and a second electrode, which are respectively connected to the first electrode 25 and the second electrode 26 of the current pickup base 24 via the first power source lead wire 28 and the second power source lead wire 29.

Figure 16:
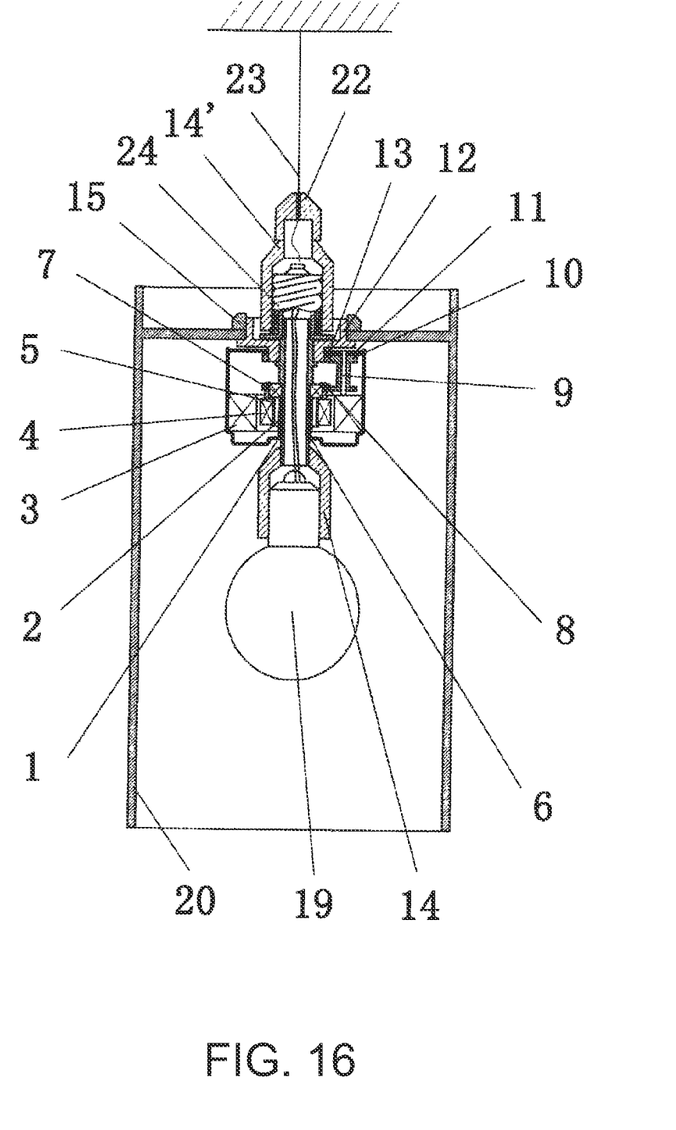
FIG. 16 is a cross-sectional view of a pendant lamp according to an embodiment of the present invention, wherein the rotary lamp holder shown in FIG. 15 is mounted.

The rotary pendant lamp shown in FIG. 16 comprises the rotary lamp holder shown in FIG. 15, the lamp cover 20 and the light source 19 (a bulb as shown in FIG. 16). The lamp cover 20 is detachably mounted on the lamp cover bracket 12 via any suitable fastening means such as a pressing nut 15. The light source 19 is received in the light source receiving socket 14. The power source line 23 hangs down from the ceiling, and runs through the connector 22 to be connected to the receiving socket 14'. The current pickup base 24 of the rotary lamp holder according to the present invention is threadedly connected in the receiving socket 14'. When the pendant lamp with such a structure is used, the entire rotary lamp holder is entirely enclosed in the lamp cover 20 so that the entire pendant lamp appears tidier, more compact and more beautiful.

Figure 17:
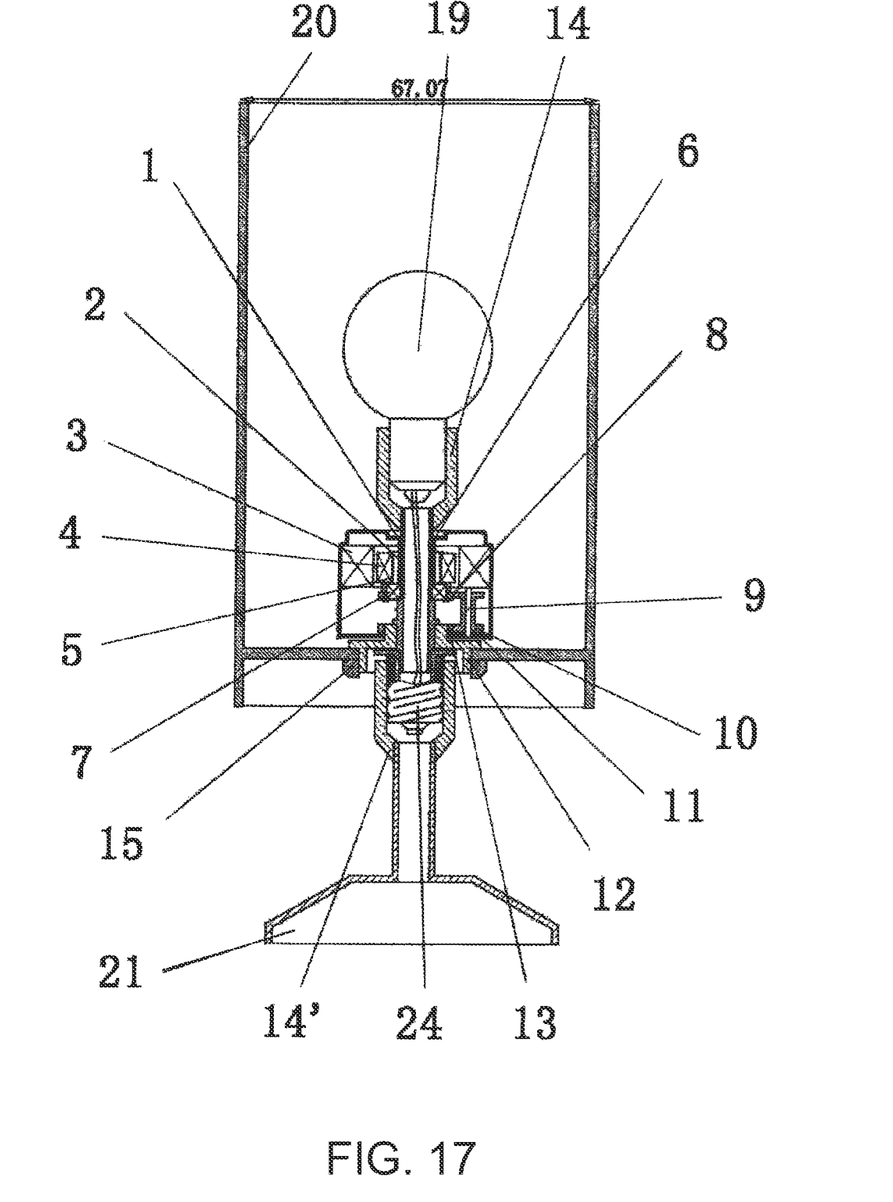
FIG. 17 is a cross-sectional view of a table lamp according to an embodiment of the present invention, wherein the rotary lamp holder shown in FIG. 15 is mounted.

The rotary table lamp shown in FIG. 17 comprises the rotary lamp holder shown in FIG. 15, the lamp cover 20, the light source 19 and the table lamp base 21. The rotary table lamp with such a structure also has a tidy and compact overall appearance.

As the rotary lamp holder according to the present invention is in fact a slow motor per se, such a modular rotary lamp holder is smaller in size and more compact in structure. In addition, when the current pickup base 24 is present, the modular rotary lamp holder according to the present invention can also directly become a universal substitute for a lamp holder mounted on an ordinary (non-rotary) lamp. The conventional ordinary lamp is upgraded by simply replacing the lamp holder mounted on the ordinary lamp with the modular rotary lamp holder according to the present invention.

Those skilled in the art shall appreciate that the above embodiments are only intended to illustrate and describe the present invention, by no means to limit the present invention. According to practical applications (e.g., in the event of the pendant lamp), the lead wire post 2 can be omitted so long as the lamp cover bracket 12 and the hollow rotating shaft 5 are arranged to be rotatable relative to the housing 1. In addition, in the present invention, a reduction transmission system is not limited to the gear system shown in the drawings, and it can be any suitable reduction transmission system such as a pulley transmission system commonly used in the art. Furthermore, even though the current pickup base 24 is shown in the form of a screw-type lamp holder, it can be obviously produced in the form of a bayonet-type lamp holder as needed.

What is claimed is:

1. A rotary lamp holder, comprising:
    a housing having a first longitudinal end and a second longitudinal end, the first longitudinal end of the housing having an opening;
    a motor stator disposed around an inner circumference of the housing;
    a rotating shaft located in the housing and rotatably mounted relative to the housing, the rotating shaft defining a cavity in communication with the opening of the first longitudinal end of the housing;
    a motor rotor fixed to the rotating shaft and coaxially disposed with the motor stator;
    a lamp cover bracket rotatably mounted relative to the housing and extending out of the first longitudinal end of the housing; and
    a reduction transmission system located in the housing and connected to the rotating shaft and the lamp cover bracket respectively.

2. The rotary lamp holder according to claim 1, further comprising: a current pickup base having a first electrode and a second electrode and fixedly mounted at the first or second longitudinal end of the housing.

3. The rotary lamp holder according to claim 2, wherein the second longitudinal end of the housing also has an opening, and the cavity of the rotating shaft is also in communication with the opening of the second longitudinal end of the housing.

4. The rotary lamp holder according to claim 3, further comprising:
    a lead wire post fixed to the housing and running through the cavity of the rotating shaft, the lead wire post defining a lead wire chamber which is in communication with the openings of the first and second longitudinal ends of the housing respectively, wherein the rotating shaft is rotatably mounted about the lead wire post.

5. The rotary lamp holder according to claim 4, wherein the lamp cover bracket is rotatably mounted about the lead wire post.

6. The rotary lamp holder according to claim 4, wherein the lead wire post has a first end and a second end which extend out of the openings of the respective longitudinal ends of the housing.

7. The rotary lamp holder according to claim 6, further comprising a light source receiving socket mounted at the first end of the lead wire post.

8. The rotary lamp holder according to claim 6, further comprising a light source receiving socket mounted at the second end of the lead wire post.

9. The rotary lamp holder according to claim 4, wherein the lead wire post is provided with a radial through hole such that the lead wire chamber of the lead wire post is in communication with an interior of the housing.

10. The rotary lamp holder according to claim 1, wherein the reduction transmission system comprises:
    an output gear fixed to the rotating shaft;
    a driven gear fixed to the lamp cover bracket; and
    an intermediate reduction gear train engaged with the output gear and the driven gear respectively.

11. The rotary lamp holder according to claim 1, wherein the reduction transmission system comprises:
    an output gear fixed to the rotating shaft;
    a planetary gear carrier fixed to the lamp cover bracket;
    a planetary gear train internal gear fixed to an internal wall of the housing; and
    a planet gear mounted on the planetary gear carrier and engaged with the output gear and the planetary gear train internal gear respectively.

12. The rotary lamp holder according to claim 7, further comprising a first lead wire and a second lead wire, wherein the light source receiving socket has a first electrode and a second electrode, the first lead wire is connected to the first electrode of the current pickup base and the first electrode of the light source receiving socket respectively, and the second lead wire is connected to the second electrode of the current pickup base and the second electrode of the light source receiving socket respectively.

13. The rotary lamp holder according to claim 12, wherein the current pickup base is shaped to enable the entire rotary lamp holder to directly replace a standardized screw-type lamp holder or bayonet-type lamp holder used on conventional lamps.

14. The rotary lamp holder according to claim 1, wherein the lamp cover bracket is provided with fastening means for detachably holding a lamp cover.

15. The rotary lamp holder according to claim 4, wherein at least one of the housing is cylindrical and the lead wire post is cylindrical.

16. The rotary lamp holder according to claim 7, wherein at least one of the light source receiving socket comprises a standardized light source receiving socket, and the lamp cover bracket comprises a standardized lamp cover bracket.

17. A rotary lamp, comprising the rotary lamp holder according to claim 1 and a lamp cover mounted on the lamp cover bracket.

18. The rotary lamp according to claim 17, wherein the rotary lamp comprises a pendant lamp, a table lamp or a ceiling lamp.

19. The rotary lamp according to claim 17, wherein the lamp cover is configured in the form of a globe, a hexahedral three-dimensional photo frame or an advertisement lamp case.

20. A rotary light-emitting globe, comprising the rotary lamp holder according to claim 1 and a lamp cover in the form of a globe mounted on the lamp cover bracket.

21. A rotary light-emitting hexahedral three-dimensional photo frame, comprising the rotary lamp holder according to claim 1 and a lamp cover in the form of a hexahedral three-dimensional photo frame mounted on the lamp cover bracket.

22. A rotary advertisement lamp case, comprising the rotary lamp holder according to claim 1 and a lamp cover in the form of an advertisement lamp case mounted on the lamp cover bracket.

23. A motor for use in a light-emitting rotary object, the motor comprising:
  a housing having a first longitudinal end and a second longitudinal end, the first longitudinal end of the housing having an opening;
  a motor stator disposed around an inner circumference of the housing;
  a rotating shaft located in the housing and rotatably mounted relative to the housing, the rotating shaft defining a cavity in communication with the opening of the first longitudinal end of the housing;
  a motor rotor fixed to the rotating shaft and coaxially disposed with the motor stator;
  a bracket rotatably mounted relative to the housing and extending out of the first longitudinal end of the housing, and
  a reduction transmission system located in the housing and connected to the rotating shaft and the bracket respectively.

24. The motor according to claim 23, further comprising:
  a current pickup base having a first electrode and a second electrode and fixedly mounted at the first or second longitudinal end of the housing.

25. A light-emitting rotary object, comprising the motor according to claim 23.

* * * * *